(12) United States Patent
Yang et al.

(10) Patent No.: US 6,220,110 B1
(45) Date of Patent: Apr. 24, 2001

(54) OIL STORING BALL RECIRCULATION BLOCK OF LEADSCREW

(75) Inventors: Paul Yang, Tai-Chung County; Chang-Hsin Kuo, Tai-Chung, both of (TW)

(73) Assignee: Hiwin Technologies Corporation, Taichung (TW)

( * ) Notice: Subject to any disclaimer, the term of this patent is extended or adjusted under 35 U.S.C. 154(b) by 0 days.

(21) Appl. No.: 09/429,915

(22) Filed: Oct. 29, 1999

(30) Foreign Application Priority Data

Jul. 6, 1999 (TW) .................................................. 88211216

(51) Int. Cl.[7] ..................................................... F16H 55/17
(52) U.S. Cl. ................................................................ 74/459
(58) Field of Search ............................ 74/89.15, 424.8 R, 74/459

(56) References Cited

U.S. PATENT DOCUMENTS

| | | | |
|---|---|---|---|
| 5,809,838 | * | 9/1998 | Miyaguchi et al. .................... 74/459 |
| 5,906,136 | * | 5/1999 | Yabe et al. ............................. 74/459 |
| 6,023,991 | * | 2/2000 | Yabe et al. ............................. 74/459 |

* cited by examiner

Primary Examiner—Dirk Wright
(74) Attorney, Agent, or Firm—Dougherty & Troxwell

(57) ABSTRACT

Disclosed herein is a leadscrew ball recirculation block with oil storing means wherein an cavity in the ball recirculation block which being not effectively used for circulating balls is utilized for storing lubrication oil. An oil exuding hole is provided to communicate with the oil stored cavity and a turning passage for balls so as to lubricate the moving balls. In order to prevent the lubrication oil remained at a standstill in a certain region in the cavity by its own gravity from failing to lubricate the balls, there is provided an oil containing element with a plurality of oil absorbing and distribution branches to lubricate the balls just passing by the turning passage. Furthermore, the ball recirculation block is formed of two pieces of plastic members bonded by supersonic wave bonding technique so as to achieve reduction of manufacturing cost and ensure perfect oil sealing effect of the ball recirculation block. With the result of such a construction, the usable lifetime of the ball recirculation block is prolonged and repeated replenishing of new oil is evaded. (FIG. 2)

9 Claims, 6 Drawing Sheets

OIL STORING BALL RECIRCULATION BLOCK OF LEADSCREW

BACKGROUND OF THE INVENTION

1. Field of the invention

The present invention relates to a ball recirculation block of leadscrew, and more particularly, to a leadscrew ball recirculation block having oil storing means.

2. Brief description of the prior art

A leadscrew assembly is conventionally constituted of a screw shaft, and a ball nut unit combined thereof together with a plurality of balls recirculating therebetween, wherein the outer surface of the screw shaft is formed into a spiral groove having semi-circular-liked cross section. The ball nut unit further includes a nut body and other components which carry balls to recirculate. The nut body is hollow with its inner surface formed into a spiral groove of semi-circular-liked cross section corresponding to the spiral groove formed on the outer surface of the screw shaft thereof. By recirculation of the balls, screw shaft and the nut unit are able to rotate relatively.

Usually, the ball recirculation block for a conventional leadscrew assembly has no oil storing means because it is believed that too big investment is required to add extra oil storing means to a leadscrew assembly.

SUMMARY OF THE INVENTION

The present invention has thus been made in view of such conventional problem. Accordingly, it is an object of the present invention to provide oil storing means in unutilized space of leadscrew ball recirculation block.

It is another object of the present invention to provide oil storing means for a leadscrew assembly without aggravatively increasing the manufacturing cost.

It is still another object of the present invention to provide oil storing means for a leadscrew assembly with improved oil storing effect to prolong the usable duration of oil stored in the leadscrew assembly without replenishing new oil repeatedly at short intervals.

To achieve the objects mentioned above, in the oil storing ball recirculation block of the present invention, an cavity in the ball recirculation block which being not used effectively is utilized for storing oil, an oil exuding hole is provided to communicate with the oil stored cavity and a turning passage for balls so as to lubricate the moving balls. In order to prevent the oil remained at a standstill in a certain region of the cavity by its own gravity from failing to lubricate the balls, the present invention provides an oil containing element with a plurality of oil absorbing and distributing branches to absorb oil remained anywhere and transport oil to lubricate the balls just passing along the turning passage. Furthermore, the ball recirculation block is formed of two pieces of plastic members bonded by supersonic wave bonding technique so as to achieve reduction of manufacturing cost and ensure perfect oil sealing effect of the ball recirculation block. With the result of such a construction, the usable lifetime of the ball leadscrew is prolonged and repeated replenishing of new oil is evaded. Incidentally, blanket, flannel and cotton cloth thread can be used to form the oil containing element.

THE BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
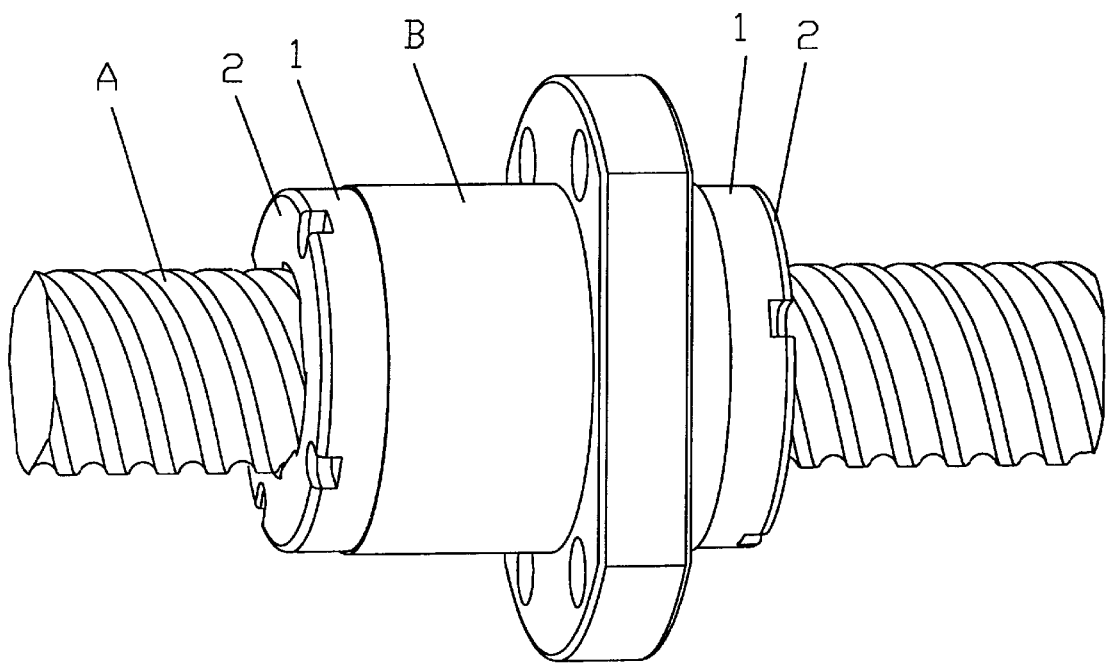
FIG. 1 is a three dimensional view showing an example of assembled leadscrew and its ball recirculation block of the present invention.
Figure 2:
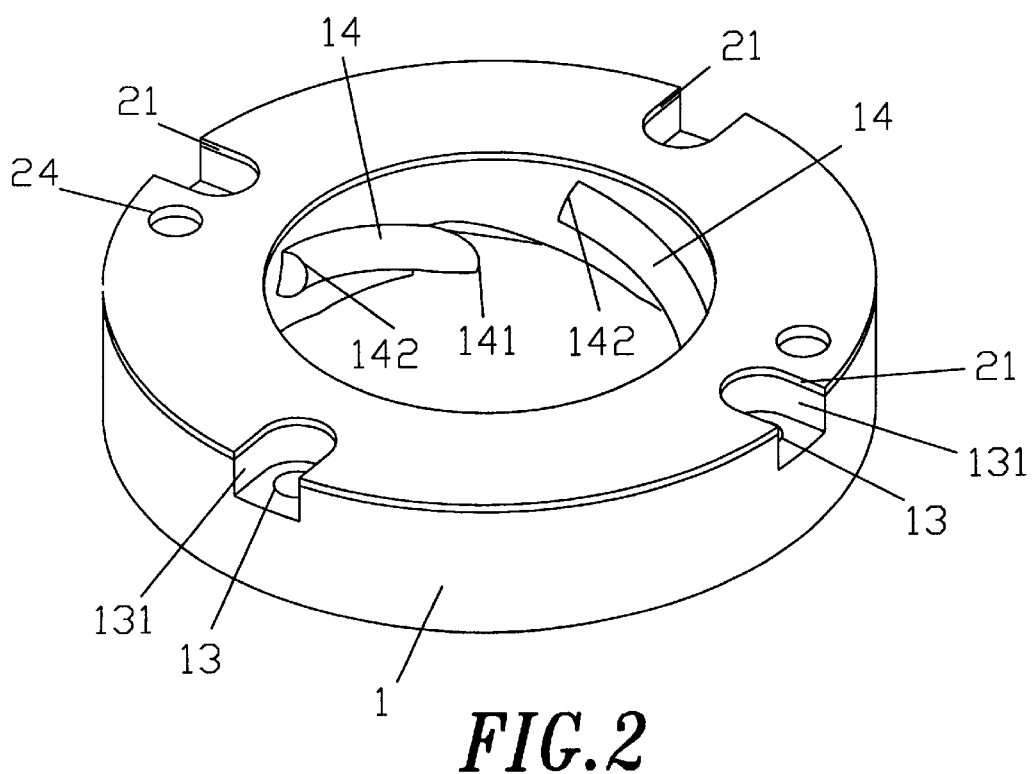
FIG. 2 is a three dimensional view a leadscrew ball recirculation block of the present invention.
Figure 3:
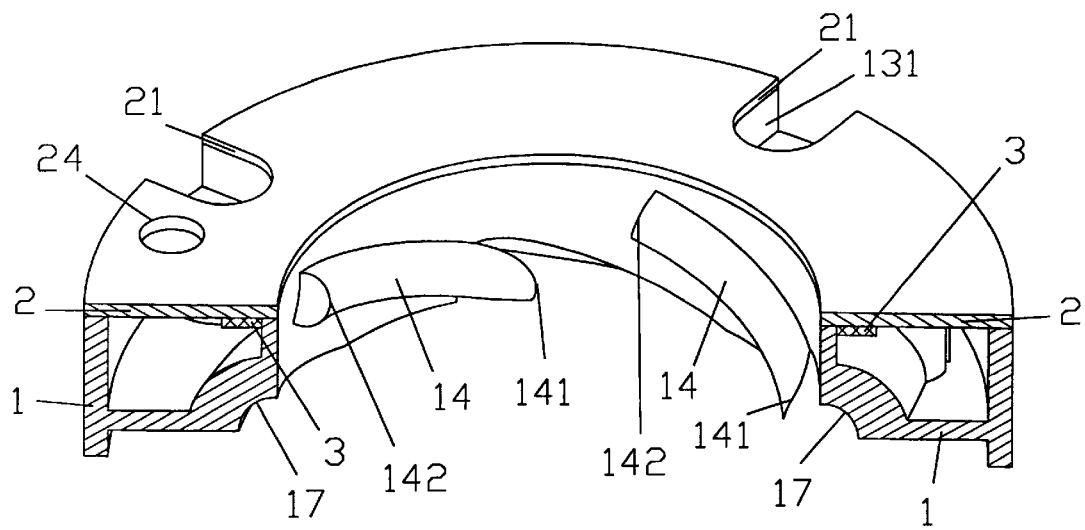
FIG. 3 is a cross sectional view of FIG. 1.

Hereinafter, the bast mode for carrying out the present invention will be described more fully below with reference to attached drawings:

Referring to FIG. 1 through FIG. 3, wherein FIG. 1 is a three dimensional view showing an example of assembled leadscrew and its ball recirculation block of the present invention, FIG. 2 is a three dimensional view of a leadscrew ball recirculation block of the present invention, and FIG. 3 is a cross sectional view of FIG. 1 As shown in these drawings, the leadscrew consists of a screw shaft A with a nut body B combined threrearound, the leadscrew ball recirculation blocks of the present invention are attached to both ends of nut body B. The ball recirculation block is constituted by a base 1 and a cover 2 of the ball recirculation block. The cover 2 and the base 1 are engaged together up and down with an oil containing element 3 accommodated therein. The base 1 are provided with several fixing bolt holes 13 for engaging the ball recirculation block to the nut body B. Further, there are formed several sinks 131 for fixing bolt on the base 1, and corresponding breaches 21 for fixing bolt hole formed on the cover 2 so as to bury the heads of the fixing bolts into the ball recirculation block thereby minimizing the occupied space. An oil nipple thread hole 24 is formed on the cover 2 for connecting an oil nipple to replenish new oil. Several ball guide members 14 are provided in the base 1. The lower end of the ball guide member 14 is formed into a guide lip 141 for guiding the ball moving around the spiral groove of the nut body into a turning passage 17, while the upper end of the ball guide member 14 is formed into a scraper lip 142 to clean up dregs accumulating in the spiral groove formed on the screw shaft of the leadscrew.

Figure 4:
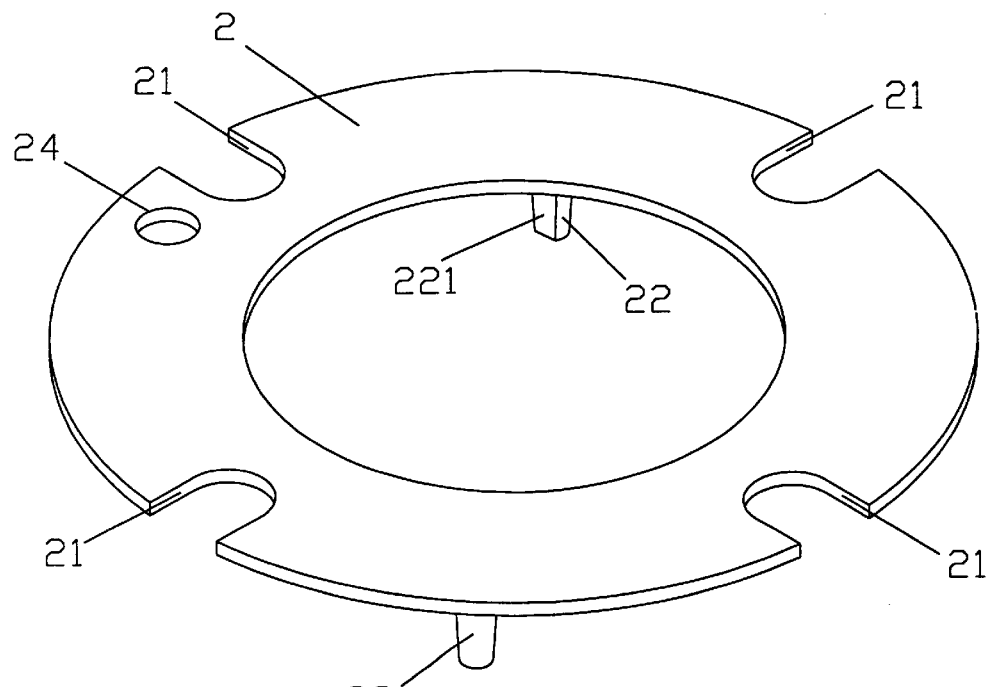
FIG. 4 is a three dimensional view of the cover of the leadscrew ball recirculation block of the present invention.
Figure 5:
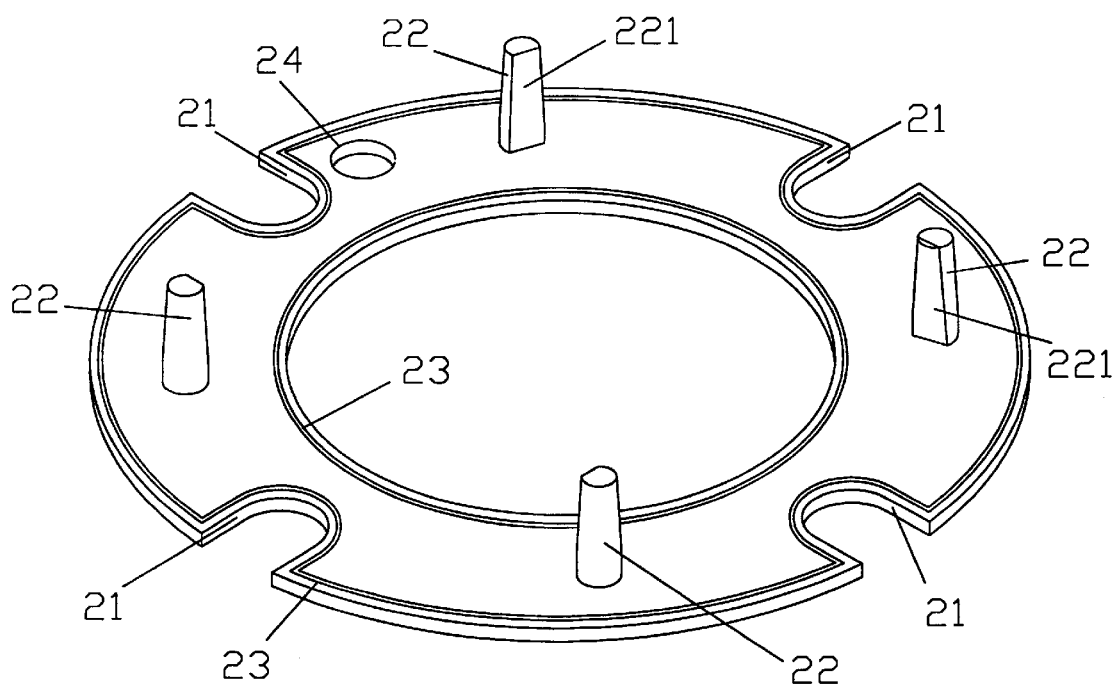
FIG. 5 is a three dimensional drawing of the cover described in FIG. 4 being viewed from inverse direction.

FIGS. 4 and 5 are three dimensional drawings of the cover of the leadscrew ball recirculation block of the present invention. As shown in FIGS. 5, several positioning studs 22 stand on the cover 2 for exactly positioning the relative position when the cover 2 is fitted on the base 1. A guide surface 221 are formed on the side wall of the positioning stud 22 for guiding an oil distribution branch 33 of the oil containing element 3 to an accurate position. In order to facilitate and ensure hermetical effect of the supersonic wave bonding to be performed to mutually bond the cover 2 and the base 1, a flange 23 is formed along the edge of the cover 2.

Figure 6:
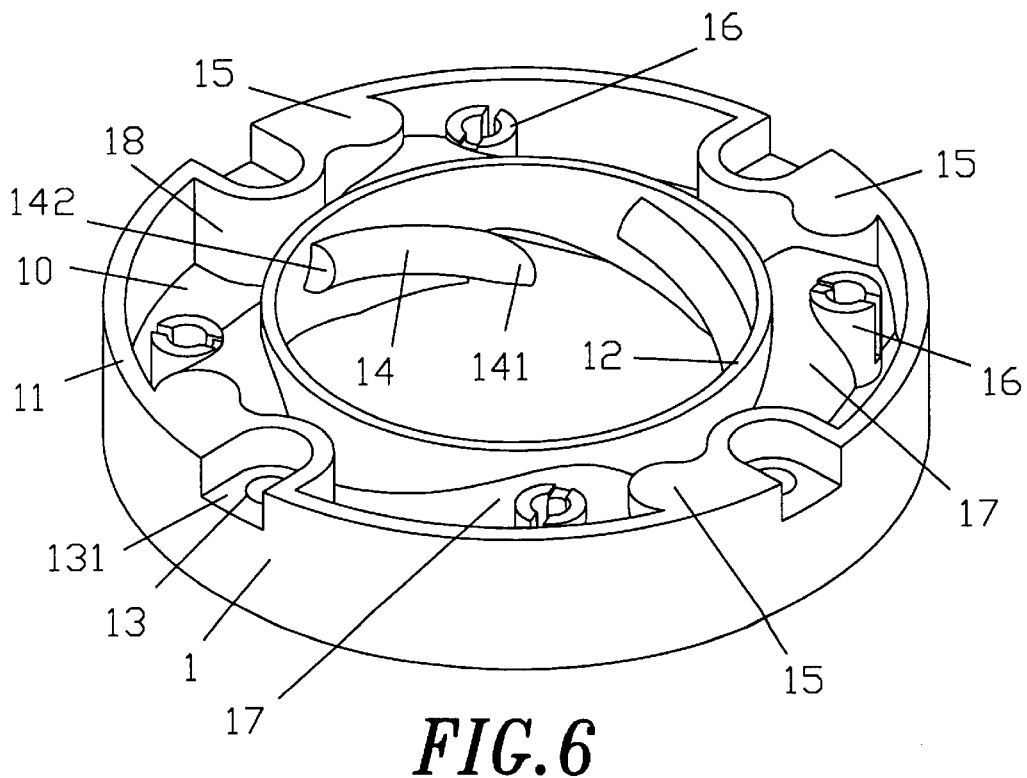
FIG. 6 is a three dimensional view of the base of the leadscrew ball recirculation block of present invention.

FIG. 6 is a three dimensional view of the base of the leadscrew ball recirculation block of the present invention. As shown in FIG. 6, an cavity 18 is formed in a vertical direction above the bottom plate 10 of base 1, and in a horizontal direction between outer rim 11 and inner rim 12 of the base 1, this cavity 18 is utilized to store the lubrication oil. An enhancing stand 15 is formed in the vicinity of each ball turning passage 17 for intensifying the turning passage 17. A hole 16 for positioning stud 22 is also bored in the vicinity of the turning passage 17 for accepting the positioning stud 22 to fit the cover 2 and base 1 at a right position before they are to be bonded each other by the supersonic wave bonding.

Figure 7:
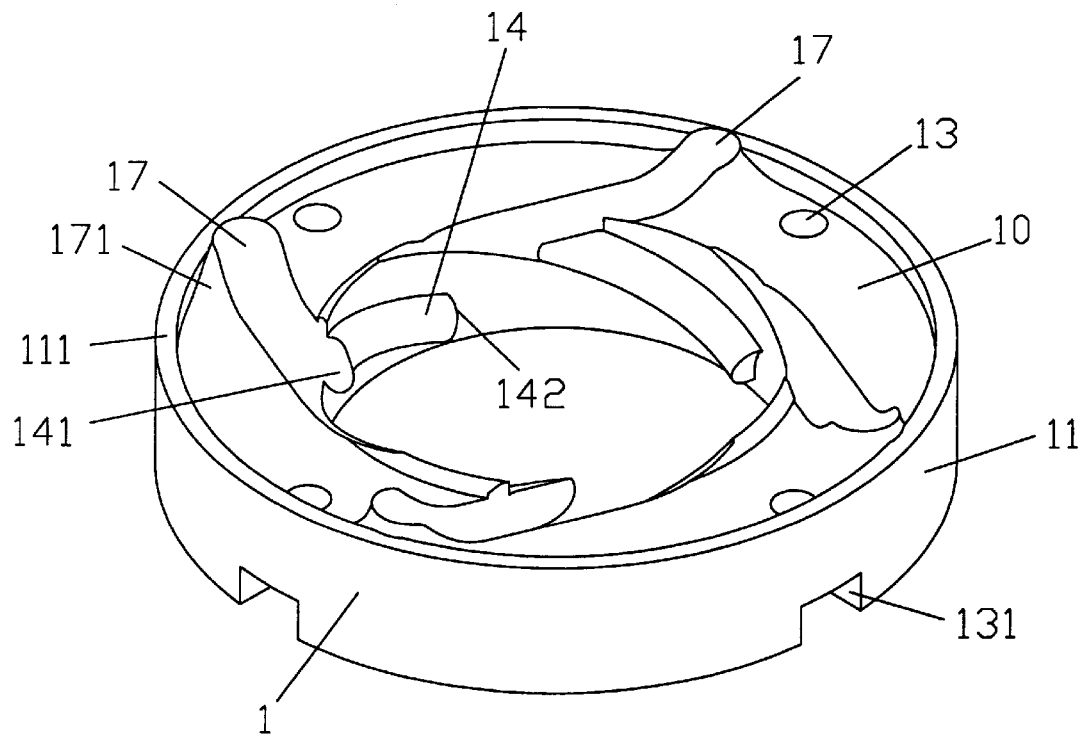
FIG. 7 is a three dimensional drawing of the base described in FIG. 6 being viewed from inverse section.

FIG. 7 is a three dimensional drawing of the base described in FIG. 6 being viewed from an inverse direction. In order to align the ball turning passage 17 accurately with respect to the ball recirculation hole of the nut body B, when the base 1 of the ball recirculation block is engaged to the nut body B, a guiding lip 171 is formed at the terminal of the turning passage 17. Besides, in order to enhance stability of engagement between the base 1 and the nut body B, a positioning ring 111 is provide around the circumference of the base 1 which is used to fit along the outer diameter of the nut body B.

Figure 8:
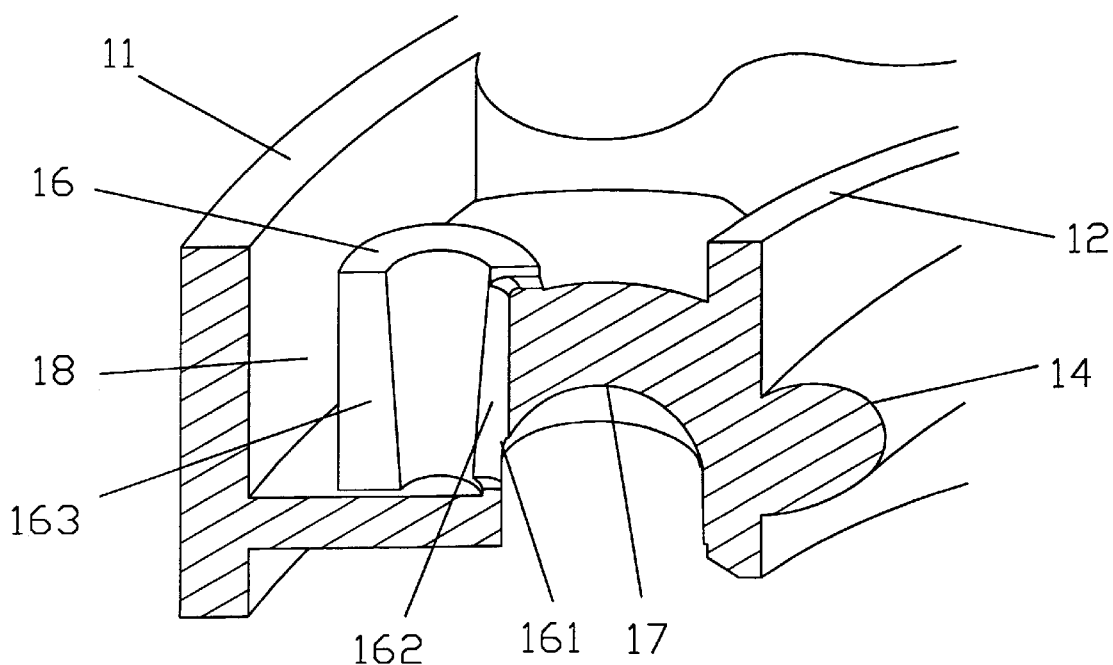
FIG. 8 is a fractional cross section view in the vicinity of the oil distribution branch guide slots at the base of the leadscrew ball recirculation block of the present invention.

FIG. 8 is a fractional cross section view in the vicinity of two oil distribution branch guide slots 162, 163 formed on the base of the leadscrew ball recirculation block of the present invention. As shown in FIG. 8, oil distribution branch guide slots 162, 163 are formed at each side of the positioning hole 16 respectively. The guide slot 162 crosses through the turning passage 17, and an oil exuding hole 161 which being able to draw the lubrication oil from the oil storing cavity 18 and instill it into the turning passage 17 is thereby formed between the turning passage 17 and the positioning hole 16.

Figure 9:
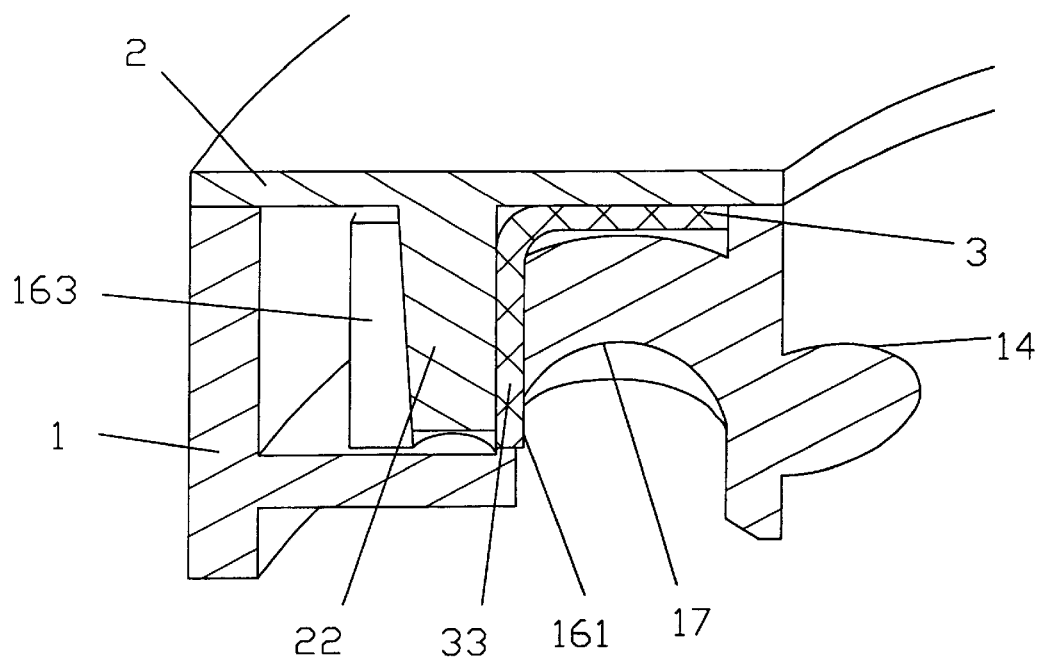
FIG. 9 is a fractional cross section view of the base in the vicinity of the oil distribution branch guide slots after the leadscrew ball recirculation block is assembled.

FIG. 9 is a fractional cross section view in the vicinity of the oil distribution branch guide slots (162, 163) after three components of base 1, cover 2, and oil containing element 3 of the leadscrew ball recirculation block are assembled. As shown in FIG. 9, when the three above mentioned components have been assembled in the position thereof, the oil distribution branch 33 is guided to its right position and in addition, is squeezed by the positioning stud 22 thereby alleviating the oozing rate of oil out of the oil distribution branch 33. The oil distribution branch 33 is slightly protruding out of the exit of the oil exuding hole 161 so as to directly contact and lubricate the balls passing by the turning passage 17.

Figure 10:
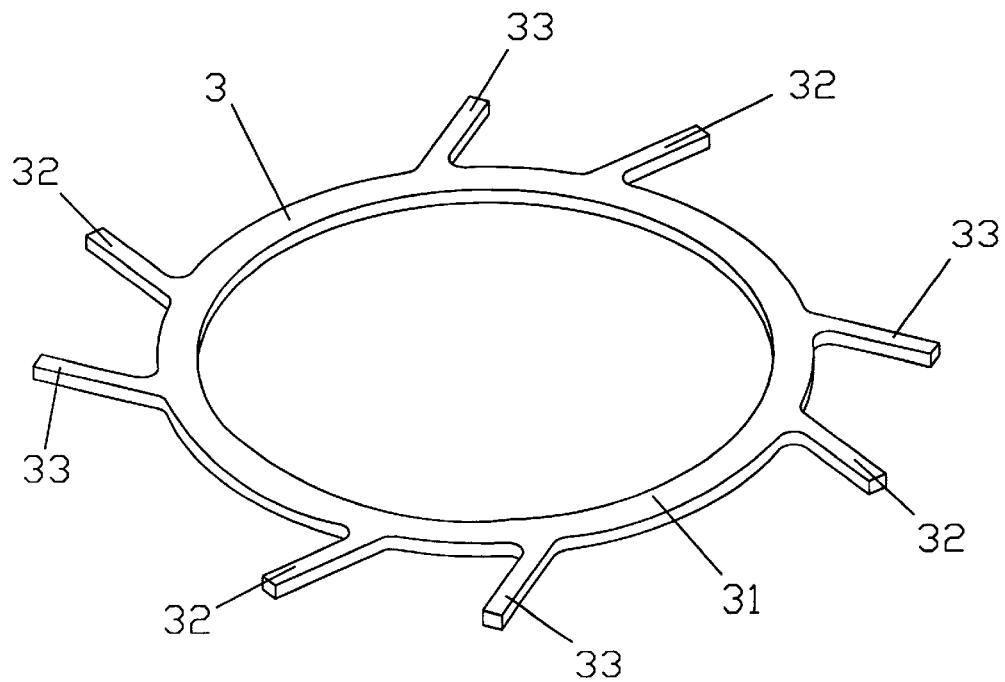
FIG. 10 is a contour drawing of the pre-assembling oil containing element in the leadscrew ball recirculation block of the present invention.

FIG. 10 is a contour drawing of the pre-assembling oil containing element 3 in the leadscrew ball recirculation block of the present invention. As shown in FIG. 10, the oil containing element 3 includes an oil absorbing ring 31, several oil absorbing branches 32 and corresponding amount of oil distribution branches 33. As the leadscrew assembly is set at random without in a specified direction when in operation, the lubrication oil stored in the cavity 18 is likely to remain at a standstill in a certain region in the cavity 18 by its own gravity and fail to lubricate the balls. To eliminate the shortcoming like this, in the present invention the oil absorbing branches 32 are disposed radially and in connection with the oil absorbing ring 31 and the oil distribution branches 33 so that each individual oil distribution branch 33 located at any position is able to keep oil thereof and lubricate the balls passing by the adjacent turning passage 17.

Figure 11:
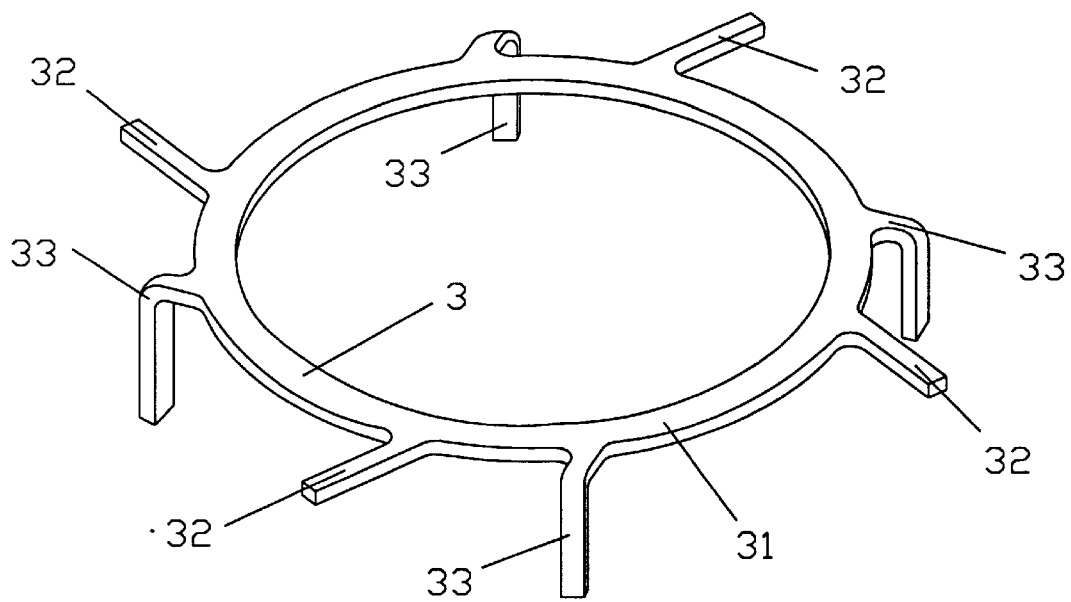
FIG. 11 is a contour drawing of the assembled oil containing element in the leadscrew ball recirculation block of the present invention.
Figure 12:
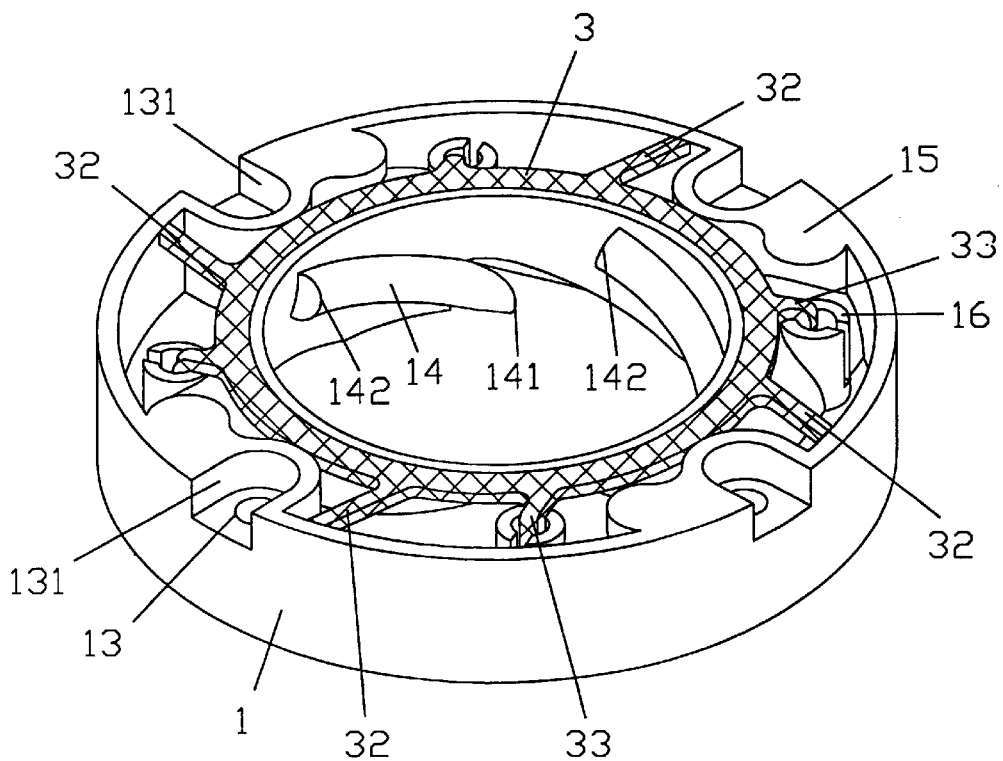
FIG. 12 is a three dimensional view of the leadscrew ball recirculation block of the present invention wherein the base joined with the assembled oil containing element installed therein.

FIG. 11 is a contour drawing of the assembled oil containing element 3, and FIG. 12 is a three dimensional view of the leadscrew ball recirculation block of the present invention wherein the cover 2 and the base 1 are fitted together with the assembled oil containing element 3 installed therein. As shown in FIGS. 11 and 12, the oil absorbing branches 32 are disposed radially, while the oil distribution branches 33 enter the oil exuding holes 161 via their respective oil distribution guide slots 162 to lubricate the balls passing by the adjacent turning passages 17.

Incidentally, blanket, flannel and cotton cloth threadcan be used to form the oil containing element 3.

Many changes and modifications in the above described embodiment of the invention can, of course be carried out without departing from the scope thereof. Accordingly, to promote the progress in science and the useful arts, the invention is disclosed and is intended to be limited only by the scope of the appended claims.

What is claimed is:

1. An oil storing ball recirculation block for leadscrew comprising at least one turning passage for a plurality of recirculating ball to change their moving direction, the width of said turning passage being slightly larger than the diameter of said recirculating balls; wherein an cavity in the inner space of said ball recirculation block for storing oil, and at least one oil exuding hole being communicated with said cavity and said turning passage.

2. The ball recirculation block of claim 1, wherein an oil containing element is disposed in said cavity.

3. The ball recirculation block of claim 2, wherein said oil containing element is deeply extended into said oil exuding hole.

4. The ball recirculation block of claim 3, wherein at least one positioning stud is provided in said ball recirculation block to contact and squeeze said oil containing element for regulating the rate of oil flowing out from said cavity into said oil exuding hole.

5. The ball recirculation block of claim 1, wherein an oil nipple is provided for connecting said cavity to external oil source to replenish new oil to said cavity therefrom.

6. The ball recirculation block of claim 1, wherein said ball recirculation block is made of plastic material.

7. The ball recirculation block of claim 6, wherein said ball recirculation block is formed of two pieces of plastic members combined together.

8. The ball recirculation block of claim 7, wherein said two pieces of plastic members are bonded with each other by supersonic wave bonding technique, and a flange with minor protuberances is provided around the boundary of said cover for facilitating supersonic wave bonding operation.

9. The ball recirculation block of claim 1, wherein a guiding lip is formed at the end of said turning passage for guiding recirculating balls.

* * * * *